US012233890B2

(12) United States Patent
Hirose et al.

(10) Patent No.: US 12,233,890 B2
(45) Date of Patent: Feb. 25, 2025

(54) REMOTE OPERATION SUPPORT SYSTEM, REMOTE OPERATION SUPPORT METHOD AND REMOTE OPERATION SUPPORTING COMPLEX SYSTEM

(71) Applicant: KOBELCO CONSTRUCTION MACHINERY CO., LTD., Hiroshima (JP)

(72) Inventors: Ryuichi Hirose, Tokyo (JP); Takayuki Doi, Hiroshima (JP)

(73) Assignee: Kobelco Construction Machinery Co., Ltd., Hiroshima (JP)

( * ) Notice: Subject to any disclaimer, the term of this patent is extended or adjusted under 35 U.S.C. 154(b) by 325 days.

(21) Appl. No.: 17/587,213

(22) Filed: Jan. 28, 2022

(65) Prior Publication Data

US 2022/0250638 A1 Aug. 11, 2022

(30) Foreign Application Priority Data

Feb. 8, 2021 (JP) ................................. 2021-018318

(51) Int. Cl.
*B60W 50/10* (2012.01)
*E02F 3/32* (2006.01)
(Continued)

(52) U.S. Cl.
CPC ........... *B60W 50/10* (2013.01); *G05D 1/0022* (2013.01); *B60W 2556/45* (2020.02); *E02F 3/32* (2013.01);
(Continued)

(58) Field of Classification Search
None
See application file for complete search history.

(56) References Cited

U.S. PATENT DOCUMENTS 7,400,959 B2 7/2008 Price et al.
11,466,431 B2 * 10/2022 Sasaki ..................... E02F 9/205
(Continued)

FOREIGN PATENT DOCUMENTS

EP 3 745 716 A1 12/2020
JP H08-85975 A 4/1996
(Continued)

OTHER PUBLICATIONS

Extended European Search Report dated Jun. 14, 2022 issued in the corresponding EP Patent Application No. 22152029.9.
(Continued)

*Primary Examiner* — Thomas E Worden
*Assistant Examiner* — Atticus A Cameron
(74) *Attorney, Agent, or Firm* — Carrier, Shende & Associates P.C.; Joseph P. Carrier; Jeffrey T. Gedeon

(57) ABSTRACT

Provided is a system or the like which can achieve improvement in remote operation efficiency of a work machine by improving an efficiency of calibration processing. A determination result of whether a remote operation factor corresponds to an actual machine operation factor is recognized by a first support processing element 121. "The remote operation factor" is a factor defining an operation setting of a remote operation mechanism 211 included in a remote operation apparatus 20. "The actual machine operation factor" is a factor defining an operation setting of an actual machine operation mechanism 411 included in a work machine 40. Processing of making the actual machine operation factor correspond to the remote operation factor is executed by a second support processing element 122 on a requirement that the determination result is negative.

8 Claims, 10 Drawing Sheets

(51) Int. Cl.
    *E02F 3/36*     (2006.01)
    *E02F 3/42*     (2006.01)
    *E02F 3/43*     (2006.01)
    *E02F 9/08*     (2006.01)
    *E02F 9/20*     (2006.01)
    *E02F 9/22*     (2006.01)
    *G05D 1/00*     (2024.01)
    *G06F 3/0338*     (2013.01)
    *G08C 17/00*     (2006.01)
    *H04Q 9/00*     (2006.01)

(52) U.S. Cl.
    CPC .............. *E02F 3/43* (2013.01); *G05D 1/0016* (2013.01); *G05D 1/0038* (2013.01); *G05D 1/005* (2013.01)

(56) References Cited

U.S. PATENT DOCUMENTS

| | | |
|---|---|---|
| 2006/0047394 A1 | 3/2006 | Price et al. |
| 2019/0127952 A1 | 5/2019 | Pfaff et al. |
| 2020/0063397 A1 | 2/2020 | Hatake et al. |
| 2021/0010235 A1* | 1/2021 | Sasaki .................. E02F 9/2012 |
| 2021/0079621 A1 | 3/2021 | Sasaki et al. |

FOREIGN PATENT DOCUMENTS

| | | |
|---|---|---|
| JP | H09-242126 A | 9/1997 |
| JP | H10-252101 A | 9/1998 |
| JP | 2003-122430 A | 4/2003 |
| JP | 2006-107461 A | 4/2006 |
| JP | 2019-167732 A | 10/2019 |
| JP | 2019-203282 A | 11/2019 |
| JP | 2020-097866 A | 6/2020 |
| KR | 20220061596 A * | 11/2020 .............. E02F 9/205 |

OTHER PUBLICATIONS

Office Action dated Jun. 25, 2024 issued in the corresponding Japanese Patent Application No. 2021-018318 with the English machine translation thereof.

* cited by examiner

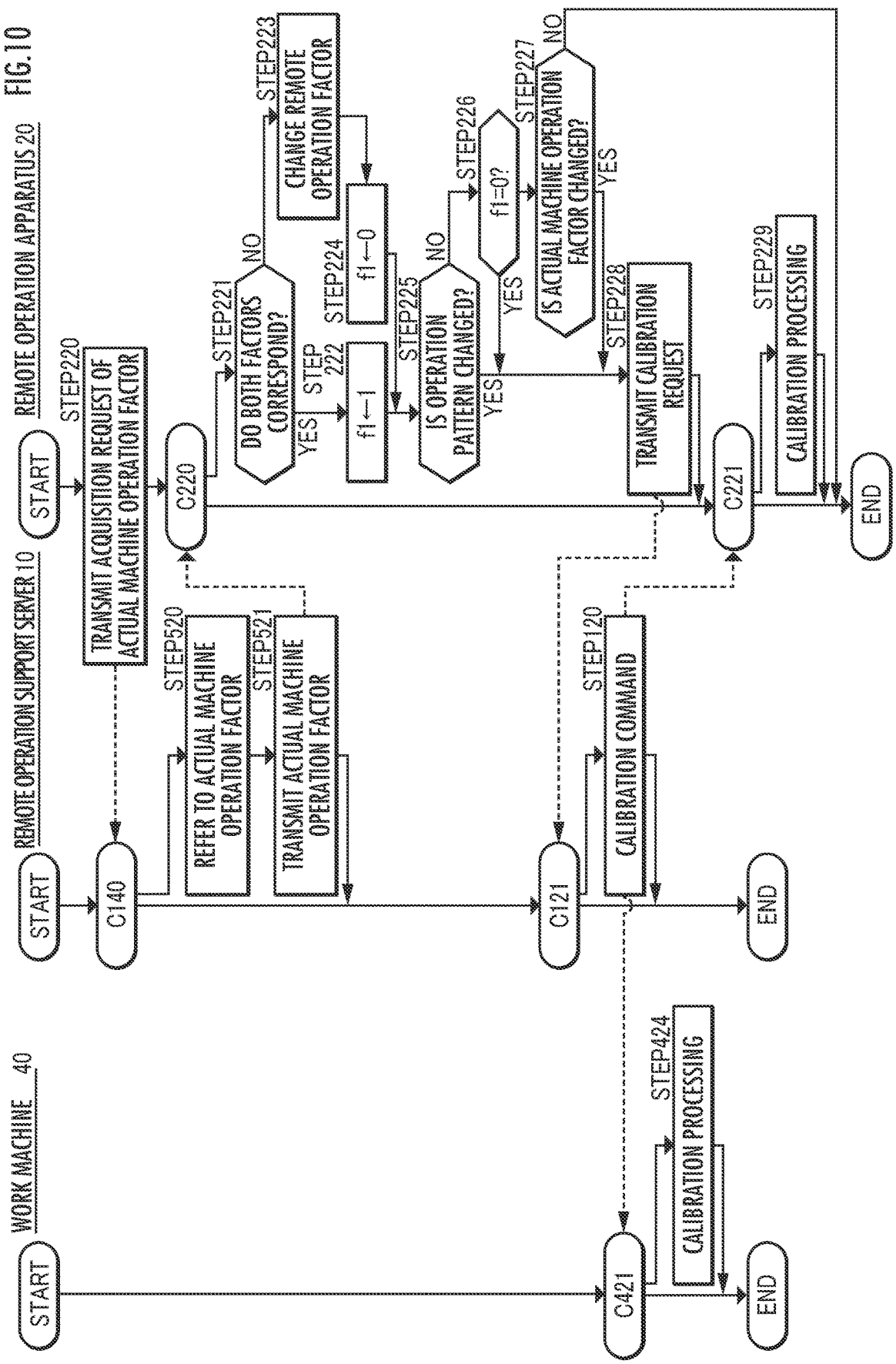

REMOTE OPERATION SUPPORT SYSTEM, REMOTE OPERATION SUPPORT METHOD AND REMOTE OPERATION SUPPORTING COMPLEX SYSTEM

BACKGROUND OF THE INVENTION

Field of the Invention

The present invention relates to a technology of remotely operating a work machine such as a hydraulic excavator with a remote operation apparatus.

Description of the Related Art

In a case where a work machine is remotely operated with a remote operation apparatus, it is necessary to match a setting of the remote operation apparatus with the work machine of a target of the remote operation.

In Japanese Patent Laid-Open No. 2019-167732, a correction value is registered to match operating characteristics of an actual machine operation mechanism such as an actual machine operation lever included in a work machine with operating characteristics of a remote operation mechanism such as a remote operation lever included in a remote operation apparatus configured to remotely operate the work machine, and correction control to operate the work machine according to an operation amount inputted into the remote operation mechanism is executed by correcting the operation amount inputted into the remote operation mechanism based on the correction value and transmitting the operation amount to the actual machine operation mechanism. The correction value is associated with a combination of type information of the work machine and type information of the remote operation mechanism.

Here, an actual machine operation mechanism that is a target of a remote operation by a remote operation apparatus may be changed. For example, actual machine operation mechanisms remotely operably mounted on a work machine that is the target of the remote operation by the remote operation apparatus are increased or decreased by remodeling. Also, in a case where the remote operation apparatus switches the work machine that is the target of the remote operation from a first work machine to a second work machine, an actual machine operation mechanism provided in the first work machine might not correspond to an actual machine operation mechanism provided in the second work machine. When the actual machine operation mechanism is changed, the registered correction value might not be applied, and it is necessary to acquire and register a new correction value.

Furthermore, a remote operation mechanism such as a remote operation lever included in the remote operation apparatus may be changed. For example, an operation pattern of the remote operation mechanism is changed. In this case, the remote operation mechanism corresponding to the actual machine operation mechanism is changed. Therefore, the registered correction value might not be applied, and it is necessary to acquire and register a new correction value.

Therefore, it is assumed that processing of securely matching the setting of the remote operation apparatus with the work machine of the target of the remote operation is executed by confirming and registering the correction value at start of a remote operation.

However, if the processing is executed every time communication between the remote operation apparatus and the work machine is established, the processing is executed even in a case where the actual machine operation mechanism or the remote operation mechanism is not changed. Consequently, the remote operation of the work machine cannot be started until the processing ends.

To solve the problem, an object of the present invention is to provide a server or the like which can achieve improvement in remote operation efficiency of a work machine by improving an efficiency of processing of matching a setting of a remote operation apparatus with the work machine of a target of the remote operation.

SUMMARY OF THE INVENTION

A remote operation support system of the present invention is a remote operation support system for supporting a remote operation of a work machine by a remote operation apparatus, the remote operation support system comprising a first support processing element which recognizes a determination result of whether a remote operation factor defining an operation setting of a remote operation mechanism included in the remote operation apparatus corresponds to an actual machine operation factor defining an operation setting of an actual machine operation mechanism included in the work machine, and a second support processing element which executes processing of making the actual machine operation factor correspond to the remote operation factor, based on communication with at least one of the remote operation apparatus and the work machine, on a requirement that the determination result recognized by the first support processing element is negative.

According to the remote operation support system with the above configuration, in a case where the remote operation factor does not correspond to the actual machine operation factor, processing of making an operation method of the remote operation mechanism included in the remote operation apparatus correspond to an operation method of the actual machine operation mechanism included in the work machine is executed. Consequently, the remote operation of the work machine may be started by the remote operation apparatus, without executing the processing of making both operation factors correspond in a case where both the factors are matched. Therefore, improvement in remote operation efficiency of the work machine can be achieved by improving an efficiency of the processing.

BRIEF DESCRIPTION OF THE DRAWINGS

FIG. 10 is an explanatory view concerning a modification of the second function of the operation support system.

DETAILED DESCRIPTION OF THE PREFERRED EMBODIMENTS (Configuration of Remote Operation Support System)

Figure 1:
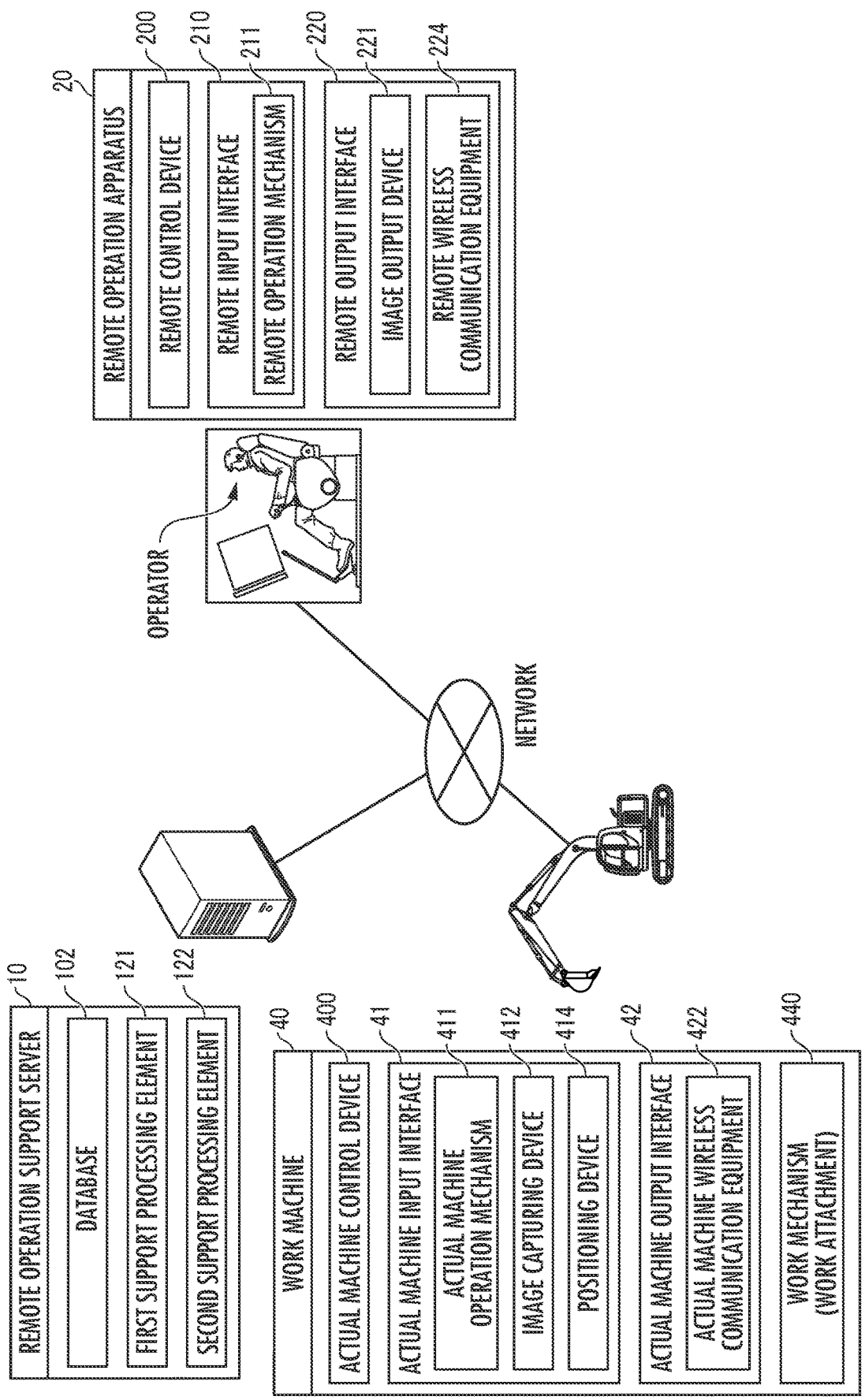
FIG. 1 is an explanatory view concerning a remote operation support system of the present invention.

A remote operation supporting complex system shown in FIG. 1 includes a remote operation support server 10, a remote operation apparatus 20 and/or a work machine 40. The remote operation support server 10, the remote operation apparatus 20 and the work machine 40 are configured to communicate with each other via a network. A mutual communication network between the remote operation support server 10 and the remote operation apparatus 20 may be the same as or different from a mutual communication network between the remote operation support server 10 and the work machine 40.

To "recognize" information by constitutional elements of the present invention is a concept including any arithmetic processing for making the information available in subsequent arithmetic processing, such as receiving the information, reading the information from a storage device, searching the information from a database, measuring the information, determining, judging, presuming or predicting the information based on basic information received or obtained otherwise, and storing the information in the storage device.

(Configuration of Remote Operation Support Server)

The remote operation support server 10 included in a remote operation support system comprises a database 102, a first support processing element 121, and a second support processing element 122. The database 102 stores and holds captured image data and the like. The database 102 may be constituted of a database server separate from the remote operation support server 10. Each support processing element is constituted of an arithmetic processing device (a single core processor or a multicore processor or a processor core included in the multicore processor), and reads required data and software from a storage device such as a memory, and executes after-mentioned arithmetic processing of the data as a target in accordance with the software.

(Configuration of Remote Operation Apparatus)

The remote operation apparatus 20 comprises a remote control device 200, a remote input interface 210, and a remote output interface 220. The remote control device 200 is constituted of an arithmetic processing device (a single core processor or a multicore processor or a processor core included in the multicore processor), and reads required data and software from a storage device such as a memory, and executes arithmetic processing of the data as a target in accordance with the software.

The remote input interface 210 comprises a remote operation mechanism 211. The remote output interface 220 comprises an image output device 221, an acoustic output device 222, and remote wireless communication equipment 224.

The remote operation mechanism 211 includes a running operation device, a pivoting operation device, a boom operation device, an arm operation device, and a bucket operation device. Each operation device includes an operation lever receiving a rotating operation. The operation lever (running lever) of the running operation device is operated to move a lower running body 410 of the work machine 40. The running lever may also serve as a running pedal. For example, a running pedal fixed to a base part or lower end of the running lever may be provided. The operation lever (pivot lever) of the pivot operation device is operated to move a hydraulic pivot motor included in a pivot mechanism 430 of the work machine 40. The operation lever (boom lever) of the boom operation device is operated to move a boom cylinder 442 of the work machine 40. The operation lever (arm lever) of the arm operation device is operated to move an arm cylinder 444 of the work machine 40. The operation lever (bucket lever) of the bucket operation device is operated to move a bucket cylinder 446 of the work machine 40.

Figure 2:
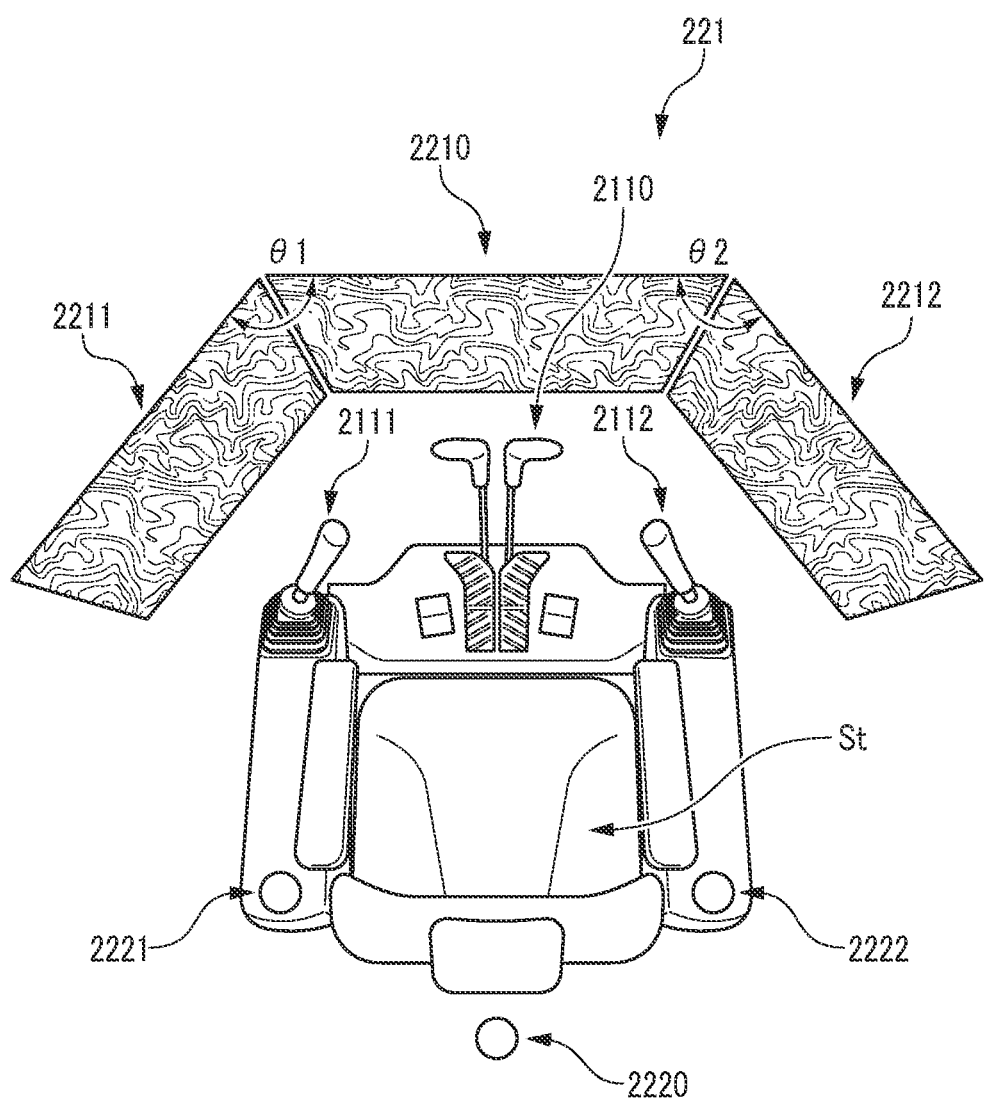
FIG. 2 is an explanatory view concerning a configuration of a remote operation apparatus.

The respective operation levers included in the remote operation mechanism 211 are arranged around a seat St on which an operator sits, for example, as shown in FIG. 2. The seat St has a form of a high back chair with arm rests, but may be a sitting part of any form on which the operator can sit, such as a form of low back chair with no head rest, or a form of a chair with no back rest.

In front of the seat St, a pair of left and right running levers 2110 corresponding to left and right crawlers are arranged on left and right side by side. One operation lever may serve as a plurality of operation levers. For example, a left operation lever 2111 provided in front of a left frame of the seat St shown in FIG. 2 may function as the arm lever when operated in a front-rear direction, and function as the pivot lever when operated in a left-right direction. Similarly, a right operation lever 2112 provided in front of a right frame of the seat St shown in FIG. 2 may function as the boom lever when operated in the front-rear direction, and function as the bucket lever when operated in the left-right direction. The lever pattern may be arbitrarily changed in response to an operation instruction of the operator.

For example, as shown in FIG. 2, the image output device 221 is constituted of a central image output device 2210, a left image output device 2211 and a right image output device 2212 arranged forward, diagonally forward left and diagonally forward right of the seat St, each device having a substantially rectangular screen. The screen (image display region) of each of the central image output device 2210, the left image output device 2211 and the right image output device 2212 may have the same shape and size or different shapes and sizes.

As shown in FIG. 2, a right edge of the left image output device 2211 is adjacent to a left edge of the central image output device 2210 in such a manner that the screen of the central image output device 2210 and the screen of the left image output device 2211 form an inclination angle θ1 (e.g., $120°≤θ1≤150°$). As shown in FIG. 2, a left edge of the right image output device 2212 is adjacent to a right edge of the central image output device 2210 in such a manner that the screen of the central image output device 2210 and the screen of the right image output device 2212 form an inclination angle θ2 (e.g., $120°≤θ2≤150°$). The inclination angles θ1 and θ2 may be the same or different.

The respective screens of the central image output device 2210, the left image output device 2211 and the right image output device 2212 may be parallel to a vertical direction, or inclined to the vertical direction. At least one image output device of the central image output device 2210, the left image output device 2211 and the right image output device 2212 may be constituted of a plurality of divided image output devices. For example, the central image output device 2210 may be constituted of a pair of image output devices each including a substantially rectangular screen, the devices being adjacent to each other in an up-down direction.

The acoustic output device 222 is constituted of one or more speakers, and constituted of a central acoustic output device 2220, a left acoustic output device 2221 and a right acoustic output device 2222 arranged behind the seat St, respectively in a left arm rest rear part and a right arm rest rear part, for example, as shown in FIG. 2. The central acoustic output device 2220, the left acoustic output device 2221 and the right acoustic output device 2222 may have the same specification or different specifications.

(Configuration of Work Machine)

The work machine 40 comprises an actual machine control device 400, an actual machine input interface 41, an actual machine output interface 42, and a work mechanism 440. The actual machine control device 400 is constituted of an arithmetic processing device (a single core processor or a multicore processor or a processor core included in the multicore processor), and reads required data and software from a storage device such as a memory, and executes arithmetic processing of the data as a target in accordance with the software.

Figure 3:
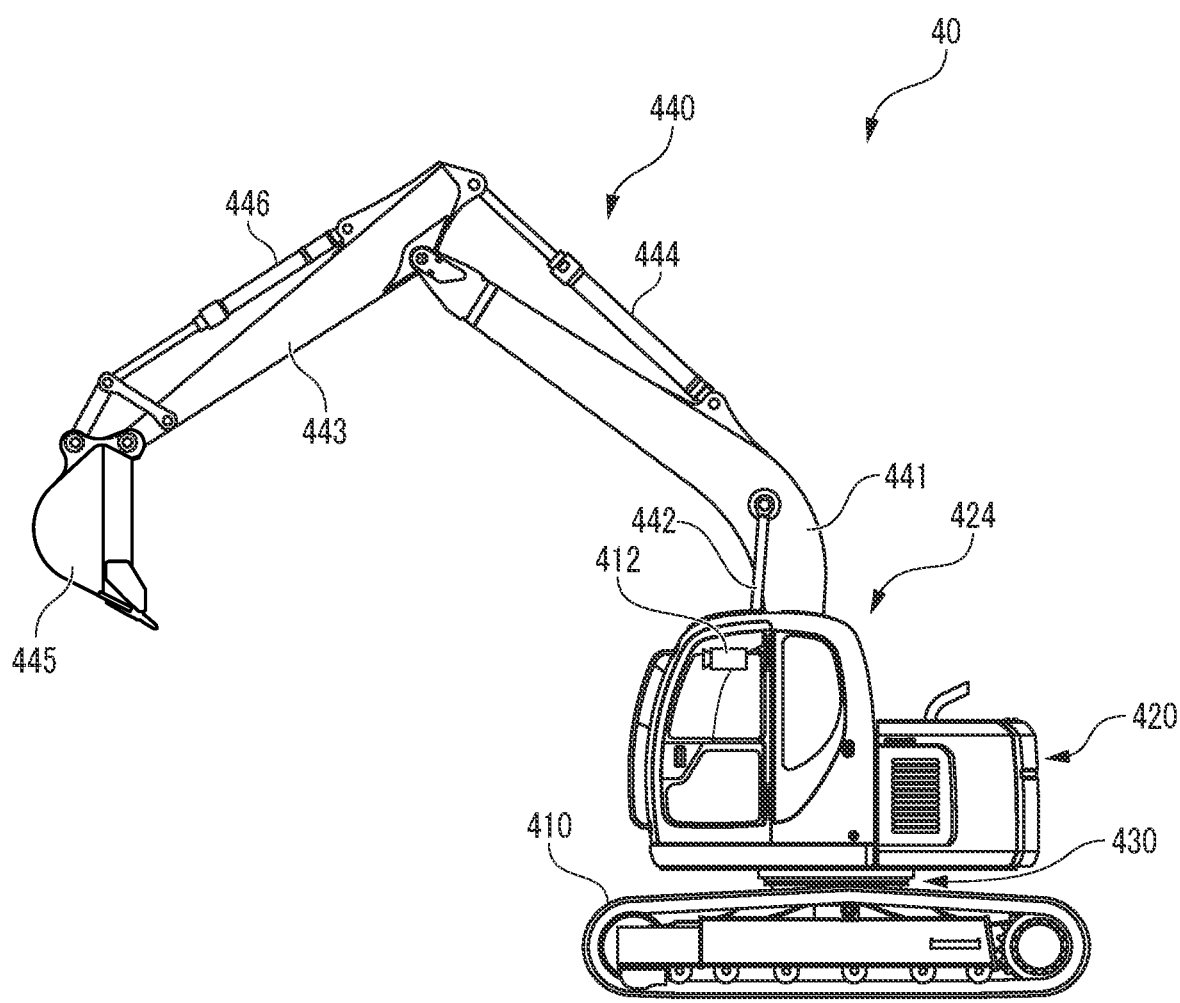
FIG. 3 is an explanatory view concerning a configuration of a work machine.

The work machine 40 is, for example, a crawler excavator (construction machine), and comprises a crawler type lower running body 410, and an upper pivot body 420 pivotally mounted on the lower running body 410 via the pivot mechanism 430, as shown in FIG. 3. The upper pivot body 420 has a front left part provided with a cab 424 (driver cab). The upper pivot body 420 has a front central part provided with the work mechanism 440.

The actual machine input interface 41 includes an actual machine operation mechanism 411, an actual machine image capturing device 412, and a positioning device 414. The actual machine operation mechanism 411 includes a plurality of operation levers arranged around a seat disposed in the cab 424 in the same manner as in the remote operation mechanism 211. A drive mechanism or a robot which receives a signal corresponding to an operation mode of a remote operation lever and moves an actual machine operation lever based on the received signal is provided in the cab 424. The actual machine image capturing device 412 is installed, for example, in the cab 424, and captures an image of an environment including at least a part of the work mechanism 440 through a front window and a pair of left and right side windows. The front window and side windows may be partially or entirely omitted. The positioning device 414 is constituted of a GPS, a gyro sensor and the like as required.

The actual machine output interface 42 comprises actual machine wireless communication equipment 422.

As shown in FIG. 3, the work mechanism 440 as a work mechanism comprises a boom 441 risably and lowerably mounted on the upper pivot body 420, an arm 443 rotatably coupled to a tip of the boom 441, and a bucket 445 rotatably coupled to a tip of the arm 443. In the work mechanism 440, the boom cylinder 442, the arm cylinder 444 and the bucket cylinder 446 are mounted, each of which is constituted of an expandable and contractible hydraulic cylinder.

The boom cylinder 442 is interposed between the boom 441 and the upper pivot body 420 in such a manner that the boom cylinder receives supply of hydraulic oil and expands and contracts to rotate the boom 441 in a rising and lowering direction. The arm cylinder 444 is interposed between the arm 443 and the boom 441 in such a manner that the arm cylinder receives supply of hydraulic oil and expands and contracts to rotate the arm 443 relative to the boom 441 around a horizontal axis. The bucket cylinder 446 is interposed between the bucket 445 and the arm 443 in such a manner that the bucket cylinder receives supply of hydraulic oil and expands and contracts to rotate the bucket 445 relative to the arm 443 around the horizontal axis.

(First Function)

Figure 4:
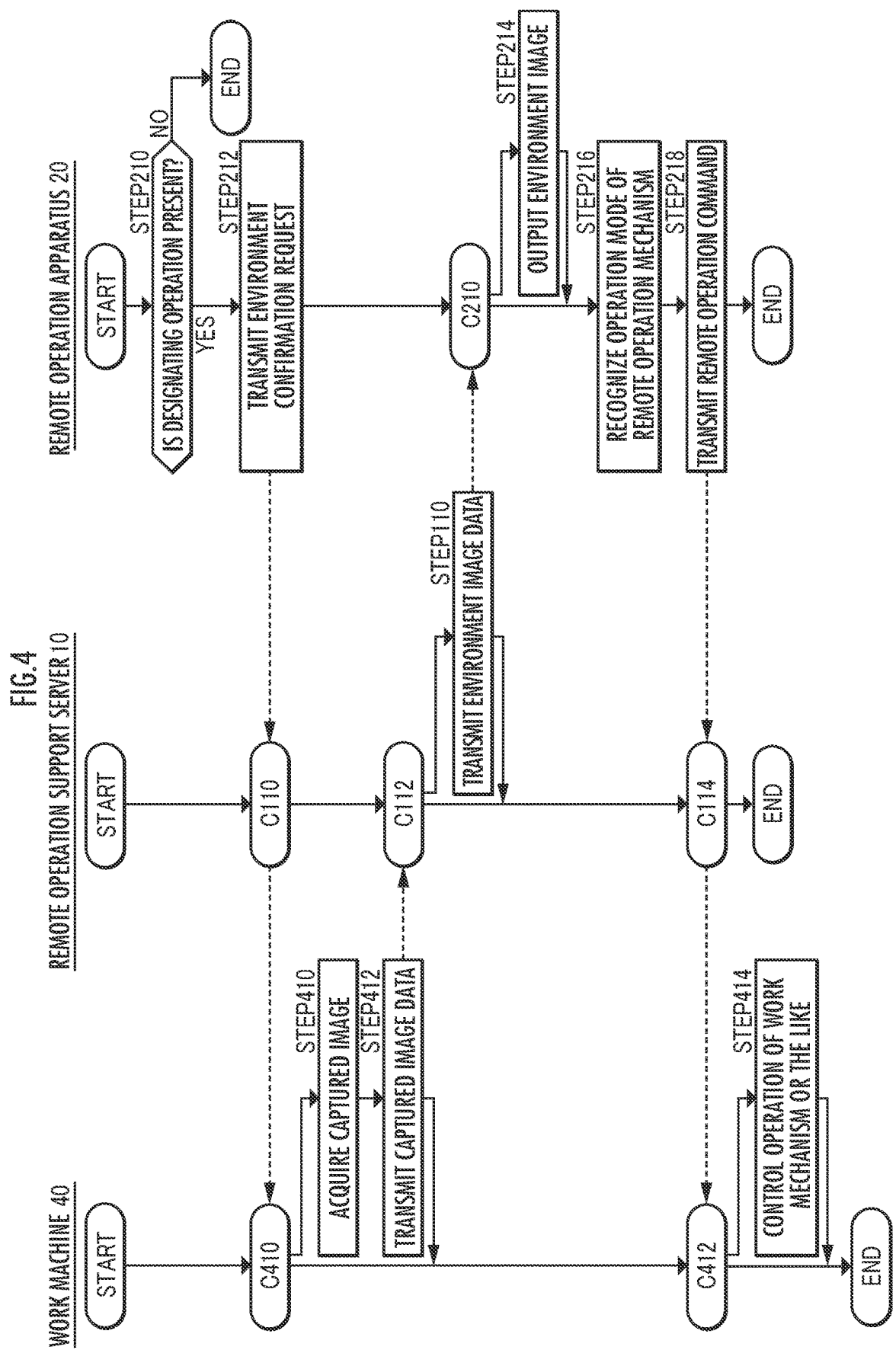
FIG. 4 is an explanatory view concerning a first function of the operation support system.

FIG. 4 is a flowchart explaining a first function as a basic function of the remote operation support system with the above configuration. In the flowchart, each block denoted with a reference sign starting with "C" is used for simplicity of description, and the block means transmission and/or reception of data, and means conditional branch to execute processing in a branch direction on a condition of the transmission and/or reception of the data. The received data is stored in the storage device constituted of the database 102 and/or a nonvolatile or volatile memory. This also applies to an after-mentioned flowchart.

In the remote operation apparatus 20, it is determined whether a designating operation through the remote input interface 210 by the operator is present (FIG. 4/STEP210). "The designating operation" is, for example, a tapping operation in the remote input interface 210 to designate the work machine 40 intended to be remotely operated by the operator. If the determination result is negative (FIG. 4/NO in STEP210), a series of processing ends. On the other hand, if the determination result is positive (FIG. 4/YES in STEP210), an environment confirmation request is transmitted to the remote operation support server 10 through the remote wireless communication equipment 224 (FIG. 4/STEP212).

In the remote operation support server 10, in a case where the environment confirmation request is received, the first support processing element 121 transmits the environment confirmation request to the corresponding work machine 40 (FIG. 4/C110).

In the work machine 40, in a case where the environment confirmation request is received through the actual machine wireless communication equipment 422 (FIG. 4/C410), the actual machine control device 400 acquires a captured image through the actual machine image capturing device 412 (FIG. 4/STEP410). Here, image processing may be executed by the actual machine control device 400 or an image processing device included in this actual machine control device. Captured image data subjected to the image processing is transmitted to the remote operation support server 10 through the actual machine wireless communication equipment 422 by the actual machine control device 400 (FIG. 4/STEP412).

In the remote operation support server 10, in a case where the captured image data is received by the first support processing element 121 (FIG. 4/C112), environment image data corresponding to the captured image is transmitted to the remote operation apparatus 20 by the second support processing element 122 (FIG. 4/STEP110). The environment image data is captured image data itself, and is additionally image data representing a simulated environment image generated based on the captured image. In a case where an image processing device 30 is constituted of the remote operation support server 10, the environment image data may be generated by subjecting the captured image data to image processing by the image processing device 30.

In the remote operation apparatus 20, in a case where the environment image data is received through the remote wireless communication equipment 224 (FIG. 4/C210), an environment image corresponding to the environment image data is outputted to the image output device 221 by the remote control device 200 (FIG. 4/STEP214).

Figure 5:
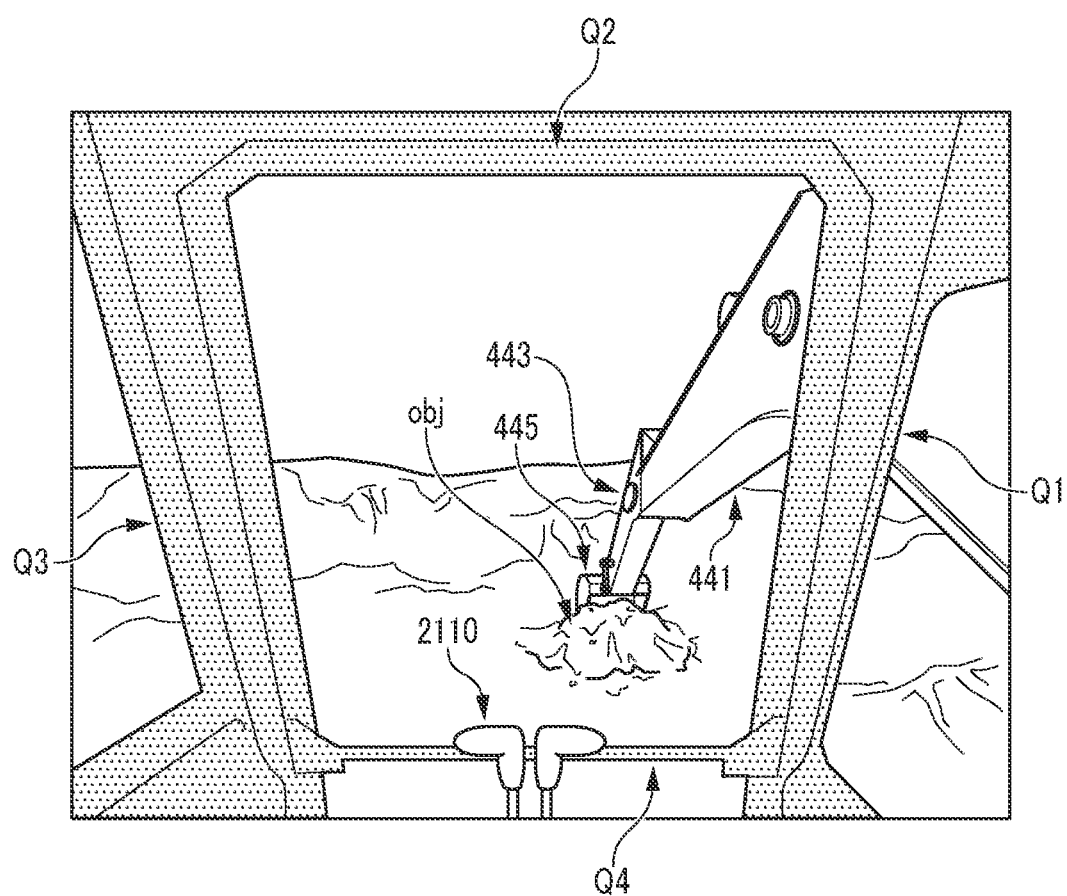
FIG. 5 is an explanatory view concerning a work environment image.

Consequently, for example, as shown in FIG. 5, in the environment image outputted by the image output device 221, the boom 441 and the arm 443 which are parts of the work mechanism 440 and a pile of rubble or earth and sand (object of a work by the bucket 445) are reflected in front of the cab 424 through a window frame constituted of a right window frame Q1, an upper window frame Q2, a left window frame Q3 and a lower window frame Q4 which define the cab 424. The environment image may be generated in such a manner that at least parts of the window frames Q1 to Q4 are not reflected, by image processing of the captured image or by view angle adjustment of the actual machine image capturing device 412. In a case where the actual machine image capturing device 412 is not provided in the cab 424 but is provided outside, a captured image in which constituent components of the cab 424, such as the window frames Q1 to Q4, are not reflected, eventually the environment image can be acquired.

In the remote operation apparatus 20, the remote control device 200 recognizes an operation mode of the remote operation mechanism 211 (FIG. 4/STEP216), and a remote operation command corresponding to the operation mode is transmitted to the remote operation support server 10 through the remote wireless communication equipment 224 (FIG. 4/STEP218).

In the remote operation support server 10, in a case where the remote operation command is received by the second support processing element 122, the remote operation command is transmitted to the work machine 40 by the first support processing element 121 (FIG. 4/C114).

In the work machine 40, in a case where the operation command is received through the actual machine wireless communication equipment 422 by the actual machine control device 400 (FIG. 4/C412), an operation of the work mechanism 440 or the like is controlled (FIG. 4/STEP414). For example, a work of scooping soil in front of the work machine 40 with the bucket 445, pivoting the upper pivot body 420 and dropping the soil from the bucket 445 is executed.

Second Function (First Embodiment)

Figure 6:
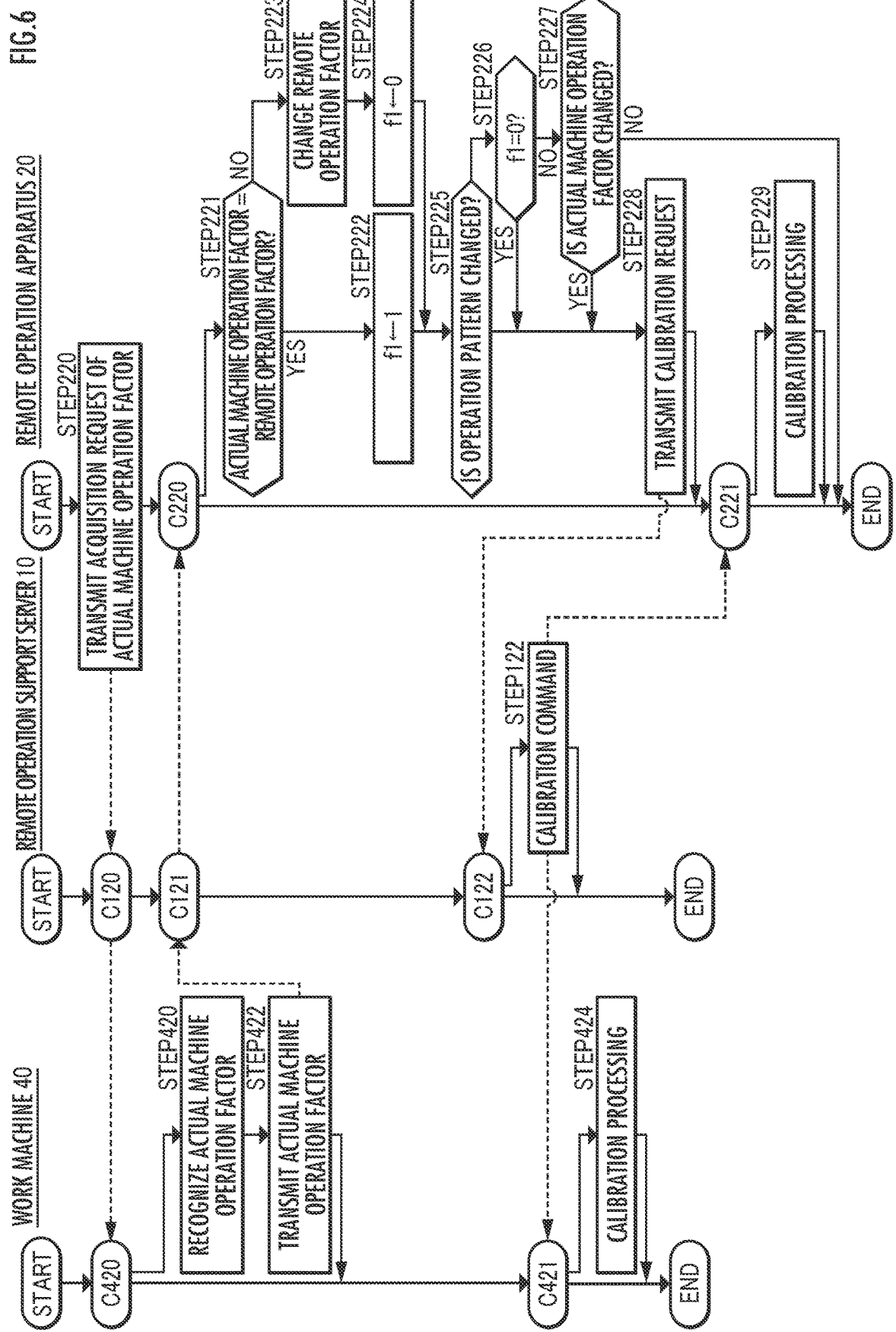
FIG. 6 is an explanatory view of a first embodiment of a second function of the operation support system.

FIG. 6 is a flowchart explaining a first embodiment of a second function as a calibration function of the remote operation support system with the above configuration.

In the remote operation apparatus 20, the remote control device 200 transmits a remote operation factor together with an actual machine identifier to the remote operation support server 10 through the remote wireless communication equipment 224 (FIG. 6/STEP220). The remote operation factor and the actual machine identifier may be transmitted from the remote operation apparatus 20 depending on determination that a trigger operation (input of the actual machine identifier or designation of the remote operation mode) in the remote input interface 210 is present. "The remote operation factor" is a factor which defines a remote operation setting of the remote operation mechanism 211 included in the remote operation apparatus 20. "The remote operation factor" corresponds to the actual machine operation mechanism 411 included in the work machine 40 intended to be remotely operated by the remote operation mechanism 211. Table 1 illustrates such correspondence.

TABLE 1

| Remote operation mechanism | Operating direction | Remote operation setting A1 | Remote operation setting A2 | Remote operation setting A3 | ... |
|---|---|---|---|---|---|
| Left operation lever | Forward tilt | Push arm | Push arm | Push arm | ... |
| Left operation lever | Rearward tilt | Pull arm | Pull arm | Pull arm | ... |
| Left operation lever | Right tilt | Pivot right | Pivot right | Pivot right | ... |
| Left operation lever | Left tilt | Pivot left | Pivot left | Pivot left | ... |
| Right operation lever | Forward tilt | Lower boom | Lower boom | Lower boom | ... |
| Right operation lever | Rearward tilt | Raise boom | Raise boom | Raise boom | ... |
| Right operation lever | Right tilt | Bucket excavation | Bucket excavation | Bucket excavation | ... |
| Right operation lever | Left tilt | Bucket soil removal | Bucket soil removal | Bucket soil removal | ... |
| Left running lever | Forward tilt | — | Run forward to left | Run forward to left | ... |
| Left running lever | Rearward tilt | — | Run rearward to left | Run rearward to left | ... |
| Right running lever | Forward tilt | — | Run forward to right | Run forward to right | ... |
| Right running lever | Rearward tilt | — | Run rearward to right | Run rearward to right | ... |
| OPT pedal | Forward tilt | — | — | Open | ... |
| OPT pedal | Rearward tilt | — | — | Close | ... |
| ... | ... | ... | ... | ... | ... |

As shown in Table 1, in a case where the actual machine operation mechanism 411 included in the work machine 40 intended to be remotely operated by the remote operation mechanism 211 includes the boom operation lever, the arm operation lever, the bucket operation lever and the pivot operation lever, a remote operation setting A1 is set. In the remote operation setting A1, a remote operation generated by tilting the left and right operation levers is set, but a remote operation generated by tilting the running lever and an optional pedal is not set. In a case of intending the running of the work machine 40 including the operation of the lower running body 410 through the operation of the remote operation mechanism 211, a remote operation setting A2 is set, and the remote operation generated by tilting the running lever is set. In a case where an optional device such as a grappler is intended to be operated by the remote operation mechanism 211, a remote operation setting A3 is set, and a remote operation generated by tilting the OPT pedal is set. A remote operation setting other than the remote operation settings A1 to A3 may be set, and corresponds to, for example, changing of a setting of an operation pattern. "The actual machine identifier" is an identifier or data for identifying or specifying the work machine 40 that is a target of the remote operation of the remote operation apparatus 20.

In the remote operation support server 10, the first support processing element 121 receives the remote operation factor and actual machine identifier (FIG. 6/C120), and an actual machine operation factor acquisition request is transmitted to the work machine 40 identified by the actual machine identifier (FIG. 6/STEP220).

In the corresponding work machine 40, upon receiving the actual machine operation factor acquisition request through the actual machine wireless communication equipment 422 by the actual machine control device 400 (FIG. 6/C420), an actual machine operation factor is recognized by being read or searched from the storage device or the database (FIG. 6/STEP420). Then, the actual machine control device 400 transmits the actual machine operation factor and actual machine identifier to the remote operation support server 10 through the actual machine wireless communication equipment 422 (FIG. 6/STEP422). "The actual machine operation factor" is a factor which defines a setting of an actual machine operation of the actual machine operation mechanism 411 included in the work machine 40, and corresponds to the actual machine operation mechanism 411 capable of receiving the remote operation. Table 2 illustrates such correspondence.

TABLE 2

| Actual machine operation mechanism | Actual machine operation setting B1 | Actual machine operation setting B2 | Actual machine operation setting B3 | ... |
|---|---|---|---|---|
| Push arm | O | O | O | ... |
| Pull arm | O | O | O | ... |
| Pivot right | O | O | O | ... |
| Pivot left | O | O | O | ... |
| Lower boom | O | O | O | ... |
| Raise boom | O | O | O | ... |
| Bucket excavation | O | O | O | ... |
| Bucket soil removal | O | O | O | ... |
| Run forward to left | — | O | O | ... |
| Run rearward to left | — | O | O | ... |
| Run forward to right | — | O | O | ... |
| Run rearward to right | — | O | O | ... |
| OPT open | — | — | O | ... |
| OPT close | — | — | O | ... |
| ... | ... | ... | ... | ... |

As shown in Table 2, in a case where the actual machine operation mechanism 411 included in the work machine 40 intended to be remotely operated by the remote operation mechanism 211 includes the boom operation lever, the arm operation lever, the bucket operation lever and the pivot operation lever, an actual machine operation setting B1 is set. In the actual machine operation setting B1, an actual machine operation mechanism marked with a circle (O) is operable when receiving the remote operation, and an actual machine operation mechanism marked with no circle (-) is not operable even when receiving the remote operation. In a case where the actual machine operation mechanism 411 can receive the remote operation of running, an actual machine operation setting B2 is set, and in a case where the actual machine operation mechanism 411 can receive the remote operation of an optional device such as the grappler, an actual machine operation setting B3 is set. The actual machine operation factor is set when the actual machine control device 400 of the work machine 40 recognizes a configuration of the actual machine operation mechanism 411 of the work machine 40, or when a service person who maintains the work machine 40 inputs the factor.

In the remote operation support server 10, the actual machine operation factor and actual machine identifier are received by the first support processing element 121 (FIG. 6/C121), and further received by the remote operation apparatus 20 (FIG. 6/C220).

In the remote operation apparatus 20, upon receiving the actual machine operation factor and actual machine identifier (FIG. 6/C220), it is determined whether the actual machine operation factor corresponds to the remote operation factor (see FIG. 6/C120) associated with the actual machine identifier (FIG. 6/STEP221).

For example, in a case where the actual machine operation factor is the operation setting B1, the actual machine operation mechanism 411 can receive the remote operations of the boom, arm, bucket and pivot, and in a case where the operation setting A1 is set as the remote operation factor to the remote operation mechanism 211, both the factors correspond. Similarly, in a case where the operation setting A2 is set to the operation setting B2 and the operation setting A3 is set to the operation setting B3, both the factors correspond.

Even when both the factors correspond, both the factors do not correspond in a case where actual machine operation mechanisms remotely operably mounted in the work machine 40 are increased or decreased by remodeling. Also, even when both the factors correspond, both the factors do not correspond in a case where the remote operation apparatus 20 switches the work machine that is the target of the remote operation. Furthermore, in a case where the setting of the operation pattern is changed as to the remote operation mechanism 211, both the factors do not correspond.

In a case where the determination result is positive (FIG. 6/YES in STEP221), a first flag f1 is set to "1" (FIG. 6/STEP222). On the other hand, in a case where the determination result is negative (FIG. 6/NO in STEP221), the remote operation factor is changed to correspond to the actual machine identifier (FIG. 6/STEP223), and the first flag f1 is set to "0" (FIG. 6/STEP224). Specifically, in a case where the first flag f1 has a value of "1", it is meant that the remote operation factor and the actual machine operation factor correspond, and in a case where the first flag f1 has a value of "0", it is meant that the remote operation factor and the actual machine operation factor do not correspond.

Next, in the remote operation apparatus 20, it is determined whether the operation pattern is changed by the remote operation mechanism 211 (FIG. 6/STEP225). For example, when the operator who operates the remote operation apparatus is changed, the operation pattern may be changed. In a case where the operation pattern is changed (FIG. 6/YES in STEP225), the operation to be inputted into the remote operation mechanism 211 changes, and hence an amount of an output of the actual machine operation mechanism which is to be corrected relative to an operation amount inputted into the remote operation mechanism 211 changes to operate the work machine 40 according to the operation amount inputted into the remote operation mechanism 211.

In a case where the operation pattern is not changed (FIG. 6/NO in STEP225), it is determined whether the value of the first flag f1 is "0" (FIG. 6/STEP226). In a case where the value of the first flag f1 is "0" (FIG. 6/YES in STEP226), the remote operation factor is changed and the operation to be inputted into the remote operation mechanism 211 is changed, and hence the amount of the output of the actual machine operation mechanism which is to be corrected relative to the operation amount inputted into the remote operation mechanism 211 changes to operate the work machine 40 according to the operation amount inputted into the remote operation mechanism 211.

In a case where the value of the first flag f1 is not "0" (FIG. 6/NO in STEP226), it is determined whether the actual machine operation factor is changed (FIG. 6/STEP227). For example, the remotely operable actual machine operation mechanisms 411 mounted in the work machine 40 that is the target of the remote operation of the remote operation apparatus 20 are increased or decreased by remodeling, and hence the actual machine operation factor at the previous remote operation may not correspond to the actual machine operation factor at the current remote operation. Also, in a case where the remote operation apparatus 20 switches the work machine that is the target of the remote operation from a first work machine to a second work machine, the actual machine operation mechanism provided in the first work machine may be different from the actual machine operation mechanism provided in the second work machine. In this case, the actual machine operation factor does not correspond. If the actual machine operation factor does not correspond, the amount of the output of the actual machine operation mechanism 411 which is to be corrected relative to the operation amount inputted into the remote operation mechanism 211 changes to operate the work machine 40 according to the operation amount inputted into the remote operation mechanism 211. In a case where it is determined that the actual machine operation factor is not changed (FIG. 6/NO in S l'EP227), a series of processing ends.

In cases where the operation pattern is changed (FIG. 6/YES in STEP225), where the value of the first flag f1 is "0" (FIG. 6/YES in STEP226), and where the actual machine operation factor is changed (FIG. 6/YES in STEP227), a calibration request to adjust the amount of the output of the actual machine operation mechanism which is to be corrected relative to the operation amount inputted into the remote operation mechanism 211 in the remote operation apparatus 20 is transmitted together with the actual machine identifier to the remote operation support server 10 (FIG. 6/STEP228).

In a case where the remote operation support server 10 receives the calibration request and actual machine identifier (FIG. 6/C122), a calibration command is transmitted to the work machine 40 that is the target of the remote operation of the remote operation apparatus 20 and to the remote operation apparatus 20 (FIG. 6/STEP122).

In a case where the work machine 40 receives the calibration command (FIG. 6/C421), calibration processing of the actual machine operation mechanism 411 is executed (FIG. 6/STEP424), and in a case where the remote operation apparatus 20 receives the calibration command (FIG. 6/C221), calibration processing of the remote operation mechanism 211 is executed (FIG. 6/STEP229).

For example, on executing calibration processing of calibrating the operation amount of the actual machine operation lever included in the actual machine operation mechanism 411, an operation of a lever drive actuator is controlled to position the actual machine operation lever to each of a neutral position and an operation position with a maximum operation amount, a control command value or position of the lever drive actuator at each operation position is stored, and data defining a correspondence between a drive command of the operation lever and the control command value of the lever drive actuator is generated by using the stored control command value by a lever drive controller. Consequently, the data is determined in such a manner that an operation state or the operation position of the actual machine operation lever included in the actual machine operation mechanism 411 in response to the drive command can be prevented from causing variations depending on the work machine 40 that is the target of the remote operation.

When executing the above processing of generating the data and then activating the lever drive actuator in response to the drive command received from a lever operation command unit, the lever drive controller executes activation control of the lever drive actuator by use of the control command value determined from the received drive command and the stored and held data. This can appropriately prevent occurrence of the variations of the operation state of the actual machine operation lever included in the actual machine operation mechanism 411 of the work machine 40 which is achieved depending on the operation of the remote operation mechanism 211 included in the remote operation apparatus 20. For example, an operation of a first operation lever of a hydraulic work machine at a neutral position and/or an operation of the lever with a maximum operation amount can be appropriately performed by the operation of the operation apparatus irrespective of differences in type and various elements of the work machine 40 that is the target of the remote operation.

The operation lever is not limited to an operation unit for the operator to execute an operation with hands, and may be an operation unit (e.g., a pedal type of operation unit) for the operator to execute an operation with feet.

Figure 7:
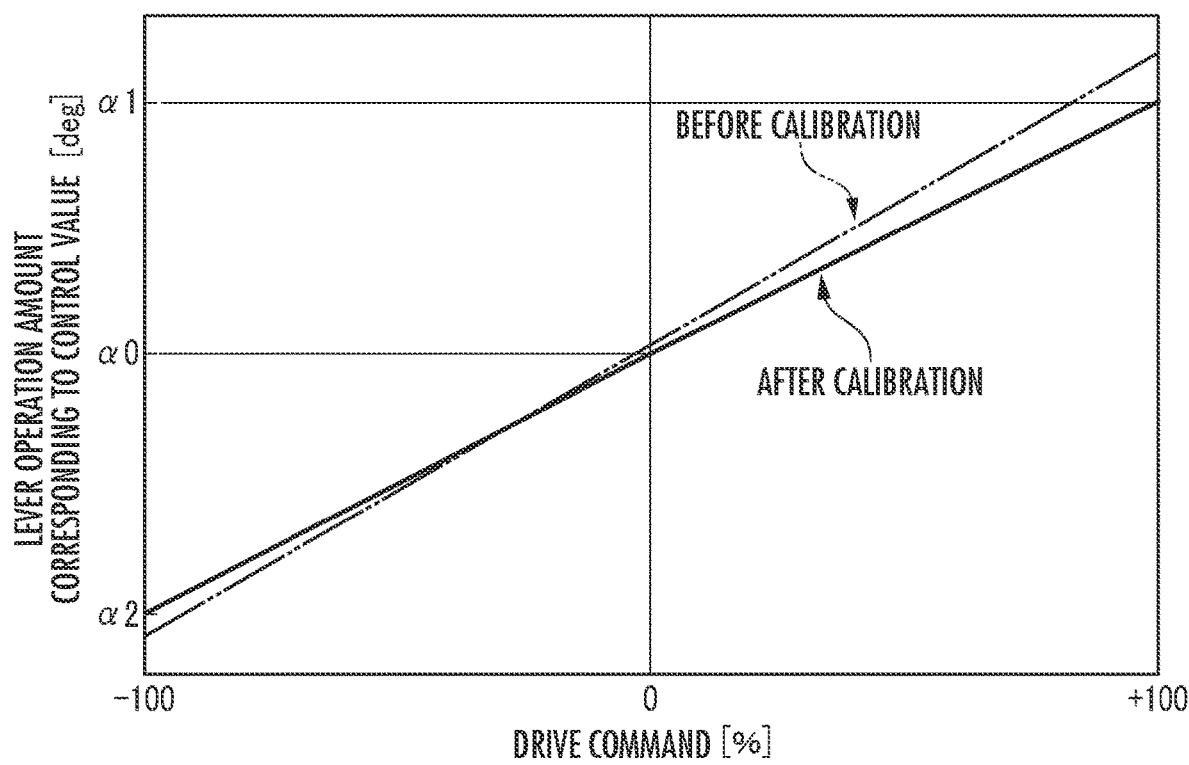
FIG. 7 is an explanatory view concerning a relation between a drive command and an operation amount of an actual machine operation lever.

As shown by a solid line in FIG. 7, data concerned with the calibration processing concerning the operation of the actual machine operation lever of the work machine 40 is generated as relational data indicating a relation between the drive command and the control command value in such a manner that the operation amount of the actual machine operation lever corresponding to the control command value linearly changes relative to the drive command in a range of the drive command from 0% to +100% and a range of the drive command from 0% to -100%. Here, 0% indicates a command not to drive the lever, +100% indicates a command to maximumly drive the lever in a positive direction, and -100% indicates a command to maximumly drive the lever in a negative direction. FIG. 7 illustrates, with a double-dashed chain line, a relation between the drive command and the operation amount of the actual machine operation lever which is represented by relational data before execution of processing.

Consequently, the work machine 40 can be remotely operated in such a manner that an operation of a hydraulic actuator in response to the operation of the operation lever is similar.

Figure 8:
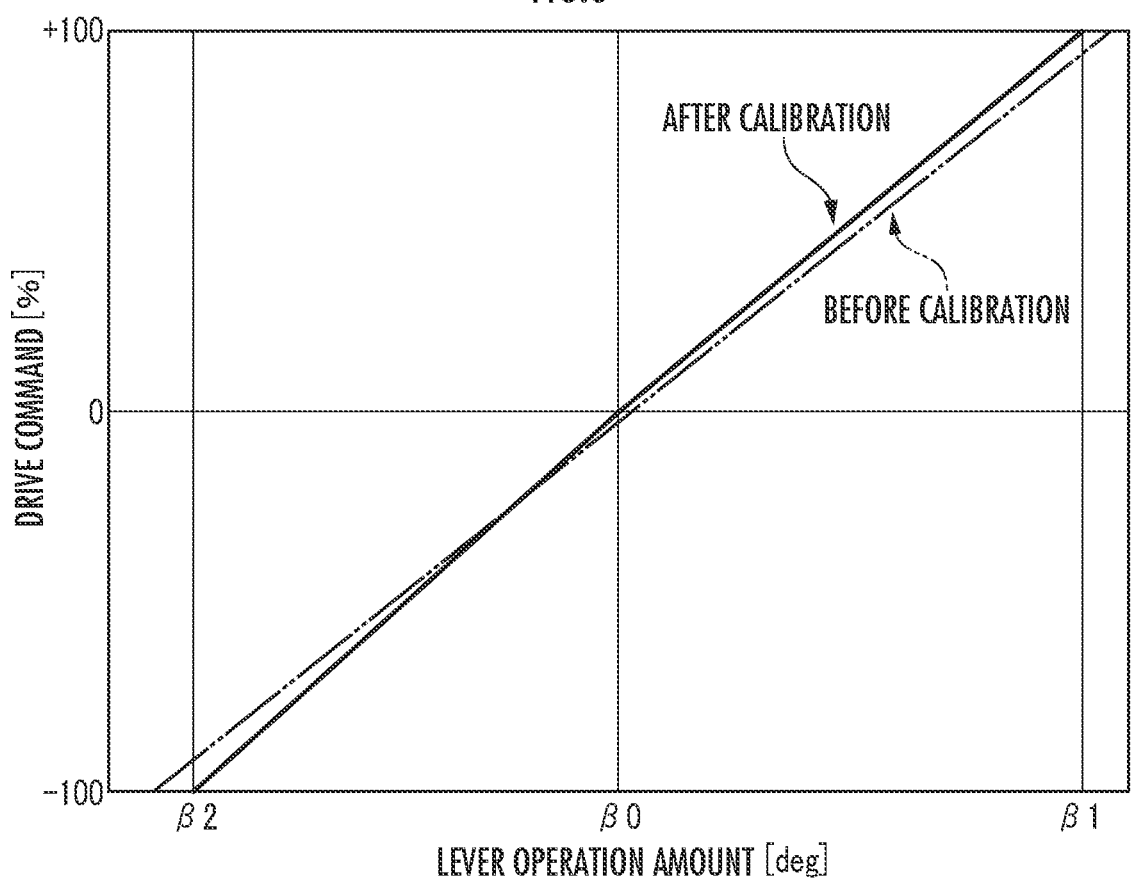
FIG. 8 is an explanatory view concerning a relation between the drive command and an operation amount of a remote operation lever.

As shown by a solid line in FIG. 8, data concerned with the calibration processing concerning the operation of the remote operation lever included in the remote operation mechanism 211 of the remote operation apparatus 20 is generated as relational data prescribing a relation between the operation amount of the remote operation lever and the drive command in such a manner that the drive command linearly changes relative to change in operation amount (swing angle) of the remote operation lever in a range of the drive command from 0% to +100% and a range of the drive command from 0% to -100%. FIG. 8 illustrates, with a double-dashed chain line, a relation between the operation amount of the remote operation lever and the drive command which is represented by relational data before execution of processing.

Consequently, the work machine 40 can be remotely operated in such a manner that the operation of the hydraulic actuator in response to the operation of the remote operation lever included in the remote operation mechanism 211 is like the operation of the hydraulic actuator in response to the operation of the actual machine operation lever included in the actual machine operation mechanism 411. As a result of the above processing, the work machine 40 can be in a state of being remotely operated through the remote operation apparatus 20 as described above (see FIG. 4).

Second Function (Second Embodiment)

Figure 9:
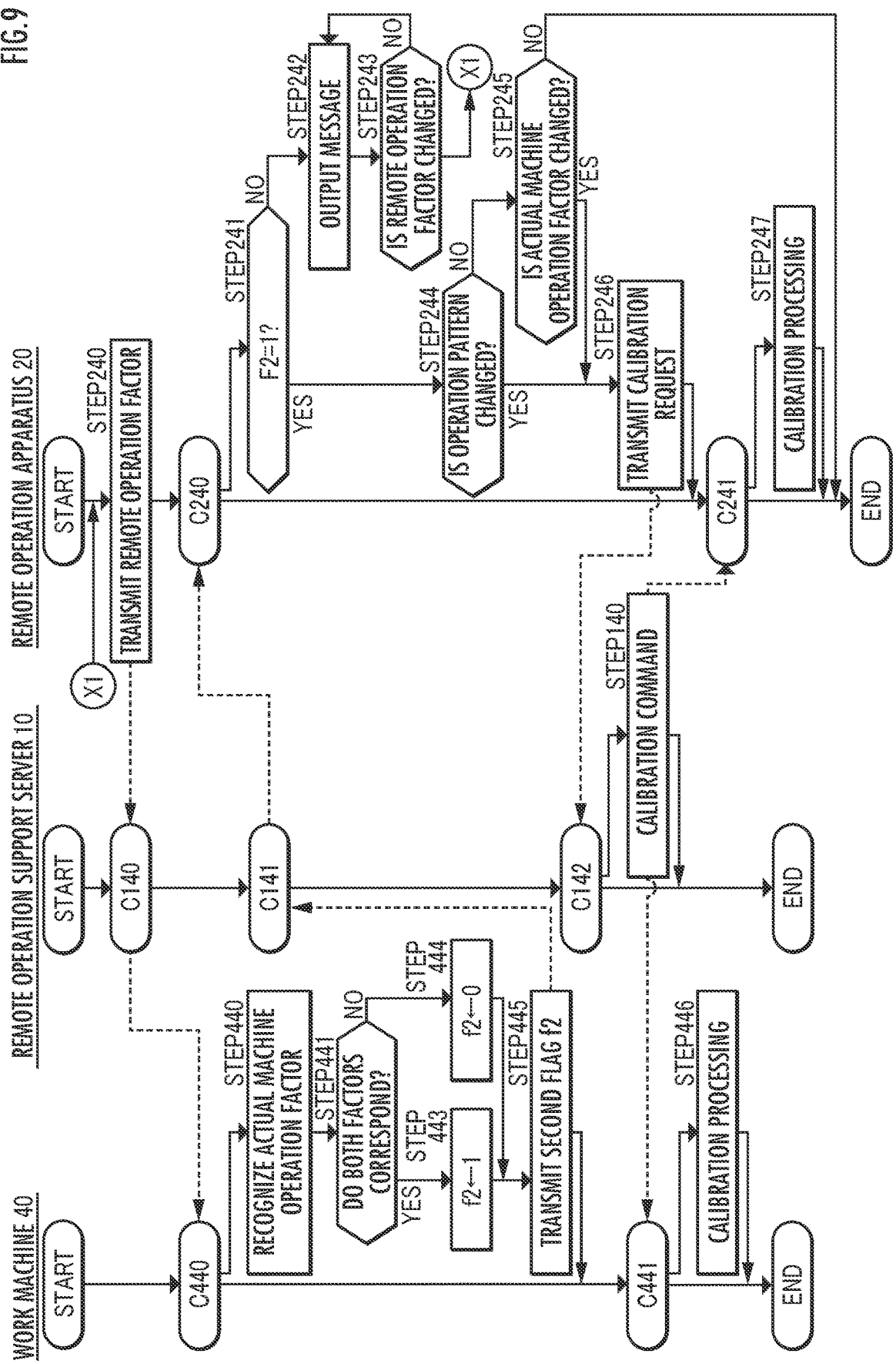
FIG. 9 is an explanatory view concerning a second embodiment of the second function of the operation support system.

FIG. 9 is a flowchart explaining a second embodiment of the second function as the calibration function of the remote operation support system with the above configuration.

In the remote operation apparatus 20, the remote operation factor is transmitted together with the actual machine identifier to the remote operation support server 10 through the remote wireless communication equipment 224 by the remote control device 200 (FIG. 9/STEP240). The remote operation factor and actual machine identifier may be transmitted from the remote operation apparatus 20 depending on the determination that the trigger operation (input of the actual machine identifier or designation of the remote operation mode) in the remote input interface 210 is present.

In the work machine 40, the remote operation factor and actual machine identifier are received by the first support processing element 121 (FIG. 9/C140), and the remote operation factor is transmitted to the work machine 40 identified by the actual machine identifier (FIG. 9/STEP240).

In the corresponding work machine 40, upon receiving the remote operation factor through the actual machine wireless communication equipment 422 by the actual machine control device 400 (FIG. 9/C440), the actual machine operation factor is recognized by being read or searched from the storage device or database (FIG. 9/STEP440). Then, the actual machine control device 400 determines whether the actual machine operation factor corresponds to the remote operation factor associated with the actual machine identifier (FIG. 9/STEP441).

In a case where the determination result is positive (FIG. 9/YES in STEP441), a second flag f2 is set to "1" (FIG. 9/STEP443). On the other hand, in a case where the determination result is negative (FIG. 9/NO in STEP441), the second flag f2 is set to "0" (FIG. 9/STEP444). Specifically, in a case where the second flag f2 has a value of "1", it is meant that the remote operation factor and the actual machine operation factor correspond, and in a case where the second flag f2 has a value of "0", it is meant that the remote operation factor and the actual machine operation factor do not correspond.

If the second flag f2 is set to "1" (FIG. 9/STEP443) or the second flag f2 is set to "0" (FIG. 9/STEP444), the actual machine control device 400 transmits the second flag f2 through the actual machine wireless communication equipment 422 to the remote operation support server 10 (FIG. 9/STEP445).

In the remote operation support server 10, upon receiving the second flag f2 by the first support processing element 121, data representing the second flag f2 is transmitted to the remote operation apparatus 20 (FIG. 9/C141).

In the remote operation apparatus 20, upon receiving the data representing the value of the second flag f2 (FIG. 9/C240), the second support processing element 122 determines whether the second flag f2 is "1" (FIG. 9/STEP241).

In a case where the determination result is negative (FIG. 9/NO in STEP241), the remote control device 200 outputs a message that encourages change of the remote operation factor, through the remote output interface 220 (FIG. 9/STEP242). In a case where it is determined that the remote operation factor is not changed (FIG. 9/NO in STEP243), the message is continuously outputted through the remote output interface 220 (FIG. 9/STEP242). In a case where an output duration of the message is more than a designated time, a series of processing may end.

On the other hand, in a case where it is determined that the remote operation factor is changed (FIG. 9/YES in STEP243), processing of or after the transmission of the remote operation factor is repeated.

In a case where the second support processing element 122 determines that the second flag f2 has the value of "1" (FIG. 9/YES in STEP241), it is determined in the remote operation apparatus 20 whether the operation pattern is changed by the remote operation mechanism 211 (FIG. 9/STEP244).

In a case where the operation pattern is not changed (FIG. 9/NO in STEP244), it is determined whether the actual machine operation factor is changed (FIG. 9/STEP245). In a case where it is determined that the actual machine operation factor is not changed (FIG. 9/NO in STEP245), a series of processing ends.

In cases where the operation pattern is changed (FIG. 9/YES in STEP244) and where the actual machine operation factor is changed (FIG. 9/YES in STEP245), the calibration request to adjust the amount of the output of the actual machine operation mode which is to be corrected relative to the operation amount inputted into the remote operation mechanism 211 in the remote operation apparatus 20 is transmitted together with the actual machine identifier to the remote operation support server 10 (FIG. 9/STEP246).

In a case where the remote operation support server 10 receives the calibration request and the actual machine identifier (FIG. 9/C142), the calibration command is transmitted to the work machine 40 that is the target of the remote operation of the remote operation apparatus 20 and to the remote operation apparatus 20 (FIG. 9/STEP140).

In a case where the work machine 40 receives the calibration command (FIG. 9/C441), calibration processing is executed (FIG. 9/STEP446), and in a case where the remote operation apparatus 20 receives the calibration command (FIG. 9/C241), the calibration processing is executed (FIG. 9/STEP247).

In the second embodiment, the message that encourages the operator to change the remote operation factor is outputted. Therefore, the operator can recognize the content of the remote operation factor.

(Effects)

According to the remote operation support system with the configuration, in the case where the remote operation factor and the actual machine operation factor do not correspond, processing is executed to make the remote operation factor of the remote operation mechanism 211 included in the remote operation apparatus 20 correspond to the actual machine operation factor of the actual machine operation mechanism 411 included in the work machine 40. Consequently, in a case where both the factors correspond, the remote operation of the work machine 40 by the remote operation apparatus 20 may be started without waiting for execution completion of calibration processing. Therefore, efficiency of processing of matching the setting of the remote operation apparatus with the work machine of the target of the remote operation is achieved.

According to the remote operation support system with the configuration, the first support processing element 121 can determine whether the actual machine operation mechanism of the work machine 40 that is the target of the remote operation by the remote operation apparatus 20 is changed. Consequently, in a case where the actual machine operation mechanism is not changed, the remote operation apparatus starts the remote operation of the work machine without executing the processing of making both the operation factors correspond, so that efficiency can be achieved. On the other hand, in a case where the actual machine operation mechanism is changed, processing of securely making the factors correspond is executed.

According to the remote operation support system with the configuration, in a case of executing the processing of making both the operation factors correspond, processing of matching the operation characteristics of the actual machine operation mechanism with the operation characteristics of the remote operation mechanism of the remote operation apparatus 20 is performed. Consequently, even in a case where the operation factor is changed, operability equivalent to before the change can be maintained.

According to the remote operation support system with the configuration, in a case where at least one of the operation pattern and the operation factor is changed, processing of making the operation characteristics of the actual machine operation mechanism correspond to the operation characteristics of the remote operation mechanism of the remote operation apparatus 20 is performed. Consequently, even in a case where only the operation pattern is changed, the operability equivalent to before the change can be maintained.

Another Embodiment of Present Invention

At least part of functional elements of the remote operation support server 10 may be constituted of the remote operation apparatus 20 and/or the work machine 40. For example, the first support processing element 121 may be constituted of the remote control device 200 and/or the actual machine control device 400 as a first arithmetic processing device. The second support processing element 122 may be constituted of the remote control device 200 and/or the actual machine control device 400 as a second arithmetic processing device. In a case where the functional element of the remote operation support server 10 is mounted in the remote operation apparatus 20, information may be communicated by wired communication through wired network mounted in the remote operation apparatus 20 in place of the wireless communication in the above embodiment. Similarly, in a case where the functional element of the remote operation support server 10 is mounted in the work machine 40, information may be communicated by wired communication through wired network mounted in the work machine 40 in place of the wireless communication in the above embodiment.

For example, concerning the first embodiment of the second function, the functional elements represented by FIG. 6/C121 and STEP122 may be included in the remote control device 200. The functional elements represented by FIG. 6/C120, C121 and STEP122 may be included in the actual machine control device 400. The functional elements represented by FIG. 6/C122 may be included in the remote control device 200 or the actual machine control device 400.

Also, concerning the second embodiment of the second function, the functional elements represented by FIG. 9/C142 may be included in the remote control device 200 or the actual machine control device 400.

Concerning the first embodiment of the second function, the recognition result of the actual machine operation factor by the work machine 40 may be sent to the remote operation support server 10 (FIG. 6/STEP422), prior to the remote operation of the remote operation apparatus 20. In this case, the recognition result of the actual machine operation factor of the work machine 40 is stored in the database 102 of the remote operation support server 10. Consequently, as shown in FIG. 10, in a case where an actual machine operation factor acquisition request is transmitted from the remote operation apparatus 20 (FIG. 10/STEP220) and the request is received by the remote operation support server 10, the actual machine operation factor stored in the database 102 is recognized without communication with the work machine 40 (FIG. 10/STEP520), so that the actual machine operation factor can be transmitted to the remote operation apparatus 20 (FIG. 10/STEP521).

Concerning the first embodiment of the second function, the message indicating the content of the remote operation factor may be outputted through the remote output interface 220.

Concerning the second function, in the above embodiment, in cases where both the factors do not correspond, where the operation pattern is changed and where the actual machine operation factor is changed, the calibration request is made in the remote operation apparatus 20, but a work efficiency may be improved by exceptionally making no calibration request even in a case where these conditions are satisfied. For example, in a case where there are histories of setting the work machine 40 to be remotely operated by the remote operation apparatus 20 and both the operation factors, and using the operation pattern in the past, data concerned with calibration processing at that time may be used.

In the remote operation support system of the present invention, it is preferable that the first support processing element recognizes the determination result of whether the remote operation factor depending on the actual machine operation mechanism set as a target of the remote operation by the remote operation mechanism corresponds to the actual machine operation factor depending on the actual machine operation mechanism included in the work machine that is the target of the remote operation of the remote operation mechanism.

According to the remote operation support system with the configuration, the first support processing element can determine whether the actual machine operation mechanism that is the target of the remote operation by the remote operation apparatus is changed. Consequently, in a case where the actual machine operation mechanism is not changed, the remote operation apparatus can start the remote operation of the work machine without executing the processing of making both the operation factors correspond. On the other hand, in a case where the actual machine operation mechanism is changed, the processing of securely making the operation factors correspond is executed.

Also, in the remote operation support system of the present invention, it is preferable that the second support processing element executes processing of acquiring a correction value to make operation characteristics of the actual machine operation mechanism included in the work machine correspond to the operation characteristics of the remote operation mechanism included in the remote operation apparatus configured to remotely operate the work machine, on the requirement that the determination result recognized by the first support processing element is negative.

According to the remote operation support system with the configuration, in a case of executing the processing of making both the operation factors correspond, the processing of matching the operation characteristics of the actual machine operation mechanism with the operation characteristics of the remote operation mechanism is further performed. Consequently, the operability equivalent to that before the change can be maintained even in the case where the operation factor is changed.

Also, in the remote operation support system of the present invention, it is preferable that the first support processing element recognizes an operation pattern in the remote operation of the actual machine operation mechanism included in the work machine that is the target of the remote operation by the remote operation mechanism, and the second support processing element executes processing of acquiring a correction value to make operation characteristics of the actual machine operation mechanism included in the work machine correspond to operation characteristics of the remote operation mechanism included in the remote operation apparatus configured to remotely operate the work machine, on at least one of the requirement that the determination result recognized by the first support processing element is negative and a requirement that the operation pattern recognized by the first support processing element is changed.

According to the remote operation support system with the configuration, processing of making the operation characteristics of the actual machine operation mechanism correspond to the operation characteristics of the remote operation mechanism is performed in a case where at least one of the operation pattern and the operation factor is changed. Consequently, the operability equivalent to that before the change can be maintained even in a case where only the operation pattern is changed.

Also, in the remote operation support system of the present invention, it is preferable that the second support processing element causes a remote output interface included in the remote operation apparatus to output a message that encourages change of the remote operation factor, and recognizes a new remote operation factor changed through a remote input interface included in the remote operation apparatus.

According to the remote operation support system with the configuration, in a case where the remote operation factor is different from the actual machine operation factor, processing of making an operation method of the remote operation mechanism included in the remote operation apparatus correspond to an operation method of the actual machine operation mechanism included in the work machine is executed depending on users will in the remote operation apparatus. Consequently, in a case where both the factors correspond, the remote operation apparatus can start the remote operation of the work machine without waiting for execution completion of the processing. Therefore, improvement in remote operation efficiency of the work machine can be achieved by improving an efficiency of the processing.

Also, in the remote operation support system of the present invention, it is preferable that the first support processing element recognizes the determination result of whether the remote operation factor corresponds to the actual machine operation factor based on communication with the work machine, after the second support processing element recognizes the new remote operation factor changed through the remote input interface.

According to the remote operation support system with the configuration, through the processing executed depending on the users will in the remote operation apparatus, secure correspondence of both the factors is achieved even in a case where the remote operation factor does not correspond to the actual machine operation factor. Therefore, the remote operation efficiency of the work machine can be improved.

REFERENCE SIGNS LIST

10 remote operation support server
20 remote operation apparatus
40 work machine
41 actual machine input interface
42 actual machine output interface
102 database
121 first support processing element
122 second support processing element
200 remote control device
210 remote input interface
211 remote operation mechanism
220 remote output interface
221 image output device
222 acoustic output device
224 remote wireless communication equipment
400 actual machine control device
424 cab (driver cab)
440 work mechanism
445 bucket (work unit)

What is claimed is:

1. A remote operation support system for supporting a remote operation of a work machine by a remote operation apparatus, the remote operation support system comprising:
a first support processing element which recognizes a determination result of whether a remote operation factor defining an operation setting of a remote operation mechanism included in the remote operation apparatus corresponds to an actual machine operation factor defining an operation setting of an actual machine operation mechanism included in the work machine; and
a second support processing element which executes processing of making the actual machine operation factor correspond to the remote operation factor, based on communication with at least one of the remote operation apparatus and the work machine, on a requirement that the determination result recognized by the first support processing element is negative, wherein
the remote operation factor corresponds to the actual machine operation mechanism included in the work machine intended to be remotely operated by the remote operation mechanism and determines a correspondence relationship between each of a plurality of operation patterns of the remote operation mechanism and each of a plurality of operation command patterns for the work machine; and
the actual machine operation factor corresponds to the actual machine operation mechanism capable of receiving the remote operation associated with the actual machine identifier for identifying or specifying the work machine that is a remote operate target of the remote control device and determines a correspondence relationship between each of a plurality of operation patterns by a drive mechanism or a robot of the actual machine operation mechanism and each of the plurality of operation command patterns for the work machine.

2. The remote operation support system according to claim 1, wherein the first support processing element recognizes the determination result of whether the remote operation factor depending on the actual machine operation mechanism set as a target of the remote operation by the remote operation mechanism corresponds to the actual machine operation factor depending on the actual machine operation mechanism included in the work machine that is the target of the remote operation of the remote operation mechanism.

3. The remote operation support system according to claim 1, wherein the second support processing element executes processing of acquiring a correction value to make operation characteristics of the actual machine operation mechanism included in the work machine correspond to operation characteristics of the remote operation mechanism included in the remote operation apparatus configured to remotely operate the work machine, on the requirement that the determination result recognized by the first support processing element is negative.

4. The remote operation support system according to claim 2, wherein
the first support processing element recognizes an operation pattern in the remote operation of the actual machine operation mechanism included in the work machine that is the target of the remote operation by the remote operation mechanism, and
the second support processing element executes processing of acquiring a correction value to make operation characteristics of the actual machine operation mechanism included in the work machine correspond to operation characteristics of the remote operation mechanism included in the remote operation apparatus configured to remotely operate the work machine, on at least one of the requirement that the determination result recognized by the first support processing element is negative and a requirement that the operation pattern recognized by the first support processing element is changed.

5. The remote operation support system according to claim 1, wherein the second support processing element causes a remote output interface included in the remote operation apparatus to output a message that encourages change of the remote operation factor, and recognizes a new remote operation factor changed through a remote input interface included in the remote operation apparatus.

6. The remote operation support system according to claim 5, wherein the first support processing element recognizes the determination result of whether the remote operation factor corresponds to the actual machine operation factor based on communication with the work machine, after the second support processing element recognizes the new remote operation factor changed through the remote input interface.

7. A remote operation supporting complex system comprising:
the remote operation support system according to claim 1; and
at least one of the work machine and the remote operation apparatus.

8. A remote operation support method for supporting a remote operation of a work machine by a remote operation apparatus, the remote operation support method comprising:
a first support processing step of recognizing a determination result of whether a remote operation factor defining an operation setting of a remote operation mechanism included in the remote operation apparatus corresponds to an actual machine operation factor defining an operation setting of an actual machine operation mechanism included in the work machine; and
a second support processing step of executing processing of making the actual machine operation factor correspond to the remote operation factor, based on communication with at least one of the remote operation apparatus and the work machine, on a requirement that the determination result recognized in the first support processing step is negative, wherein
the remote operation factor corresponds to the actual machine operation mechanism included in the work machine intended to be remotely operated by the remote operation mechanism and determines a correspondence relationship between each of a plurality of operation patterns of the remote operation mechanism and each of a plurality of operation command patterns for the work machine; and
the actual machine operation factor corresponds to the actual machine operation mechanism capable of receiving the remote operation associated with the actual machine identifier for identifying or specifying the work machine that is a remote operate target of the remote control device and determines a correspondence relationship between each of a plurality of operation patterns by a drive mechanism or a robot of the actual machine operation mechanism and each of the plurality of operation command patterns for the work machine.

* * * * *